(12) United States Patent
Ekberg (10) Patent No.: US 7,882,239 B2
(45) Date of Patent: Feb. 1, 2011

(54) COMMUNICATIONS METHOD AND APPARATUS, DATABASE INFORMATION RETRIEVAL METHOD AND APPARATUS

(75) Inventor: Christian Ekberg, Espoo (FI)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 538 days.

(21) Appl. No.: 11/569,708

(22) PCT Filed: May 28, 2004

(86) PCT No.: PCT/EP2004/050960

§ 371 (c)(1), (2), (4) Date: Nov. 28, 2006

(87) PCT Pub. No.: WO2005/120003

PCT Pub. Date: Dec. 15, 2005

(65) Prior Publication Data

US 2008/0052400 A1    Feb. 28, 2008

(51) Int. Cl.
G06F 15/16 (2006.01)
G06F 7/00 (2006.01)
H04M 15/06 (2006.01)

(52) U.S. Cl. .............. 709/227; 709/203; 707/621; 379/142.06

(58) Field of Classification Search ............ 709/227; 707/100
See application file for complete search history.

(56) References Cited

U.S. PATENT DOCUMENTS

| | | | |
|---|---|---|---|
| 6,192,218 B1 * | 2/2001 | Laufmann et al. | 340/7.53 |
| 6,298,128 B1 * | 10/2001 | Ramey et al. | 379/142.01 |
| 6,411,696 B1 * | 6/2002 | Iverson et al. | 379/201.06 |
| 6,446,127 B1 * | 9/2002 | Schuster et al. | 709/227 |
| 6,747,970 B1 * | 6/2004 | Lamb et al. | 370/352 |
| 6,862,342 B1 * | 3/2005 | Hua et al. | 379/88.13 |
| 2002/0018464 A1 * | 2/2002 | Kikinis | 370/352 |
| 2002/0107918 A1 * | 8/2002 | Shaffer et al. | 709/203 |
| 2003/0040325 A1 * | 2/2003 | Clark | 455/461 |
| 2003/0043986 A1 * | 3/2003 | Creamer et al. | 379/201.03 |
| 2003/0092432 A1 * | 5/2003 | Hwang | 455/415 |
| 2004/0111376 A1 * | 6/2004 | Kokko | 705/74 |
| 2005/0169446 A1 * | 8/2005 | Randall et al. | 379/93.23 |

* cited by examiner

*Primary Examiner*—Ario Etienne
*Assistant Examiner*—Blake Rubin (57) ABSTRACT

A method is provided of establishing a communications session between first and second devices associated with first and second parties respectively. A session request message indicates a request to establish the session and comprises session information. In response to the session request message, further information is retrieved and included in the session request message. A session is established based on information in the resulting session request message. The session may be established between the first and second devices using Session Initiation Protocol (SIP). Summary information is included for determining complete information by the second device after the session has been established. The complete information is stored in a mail server and the summary information derived from the complete information is stored in a database. The summary information is retrieved from the database for inclusion in the further information so as to enable the second device subsequently to retrieve complete information from the mail server relating to that summary information.

20 Claims, 7 Drawing Sheets

COMMUNICATIONS METHOD AND APPARATUS, DATABASE INFORMATION RETRIEVAL METHOD AND APPARATUS

BACKGROUND OF THE INVENTION

1. Field of the Invention

The present invention relates to a method of establishing a communications session between first and second devices associated with first and second parties respectively. In one particular example of the present invention, establishment of the communications session is performed using the Session Initiation Protocol. A further aspect of the present invention relates to a database system, a database, a method for retrieving information from a database, and a method for enabling retrieval of information from a database.

2. Description of the Related Art

The Session Initiation Protocol (SIP) is a signalling protocol for creating, modifying and terminating sessions involving one or more participants in a communications network. These sessions include Internet multimedia conferences, Internet (or any IP network) telephone calls and multimedia distribution, with participants in a session communicating via a multicast or via a number of unicast relations, or a combination of these.

The SIP allows session originators to deliver invitations to potential session participants wherever they may be in the network, providing name translation and user location functions to ensure that the call reaches the called party irrespective of their location. The SIP also provides feature negotiation functions which allow the parties involved in a call to agree on the features supported, recognising that not all the parties can support the same level of features (for example, video may or may not be supported). The SIP also provides call participant management functions, allowing a party to bring other parties into the session or cancel connections with certain other parties; parties can also be transferred or placed on hold. Finally, the SIP supports call feature change functions whereby a party in a session is able to change the call characteristics during the course of the call, for example changing the session from one set up as "voice-only" to one that enables a video function. A third party joining a call may also require different features to be enabled in order to participate in the call.

The SIP is an RFC (Request For Comments) standard (RFC 3261) from the Internet Engineering Task Force (IETF). The SIP is an application layer protocol, and takes a modular approach that is free from any underlying protocol or architectural constraints. The SIP has been designed so that it can easily bind SIP functions to existing protocols and applications, such as e-mail and Web browsers, focusing on a specific set of functions. The SIP has also been designed to reuse as many existing protocols and protocol design concepts as possible; for example, SIP was modeled after HTTP, using Uniform Resource Locators (URLs) for addressing and the Session Description Protocol (SDP) to convey session information. With the SIP, each party is identified through a hierarchical URL that is built around elements such as a user's phone number or host name (for example, sip: user@company.com), meaning that it is straightforward to redirect a caller to another phone as it is to redirect someone to a webpage.

The SIP also uses MIME (Multipurpose Internet Mail Extensions) to convey information about the protocol used to describe the session, and as a result, SIP messages can contain Java Applets, images, audio files, authorisation tokens or billing data. The SIP also uses the Domain Name System (DNS) to deliver requests to a server that can appropriately handle them, simplifying the integration of voice and e-mail. Servers along the call path can easily create and forward e-mail messages, and vice-versa, enabling various combined services. The SIP is independent of the packet layer, typically being used over the User Datagram Protocol (UDP) or the Transport Control Protocol (TCP).

The SIP has been adopted by the Voice-over-IP community as its protocol of choice for signalling, and as will be described further below has been chosen as the signalling protocol for establishing multimedia sessions in Universal Mobile Telecommunications System (UMTS) Release 5 IP Multimedia Subsystems (IMS).

Figure 1:
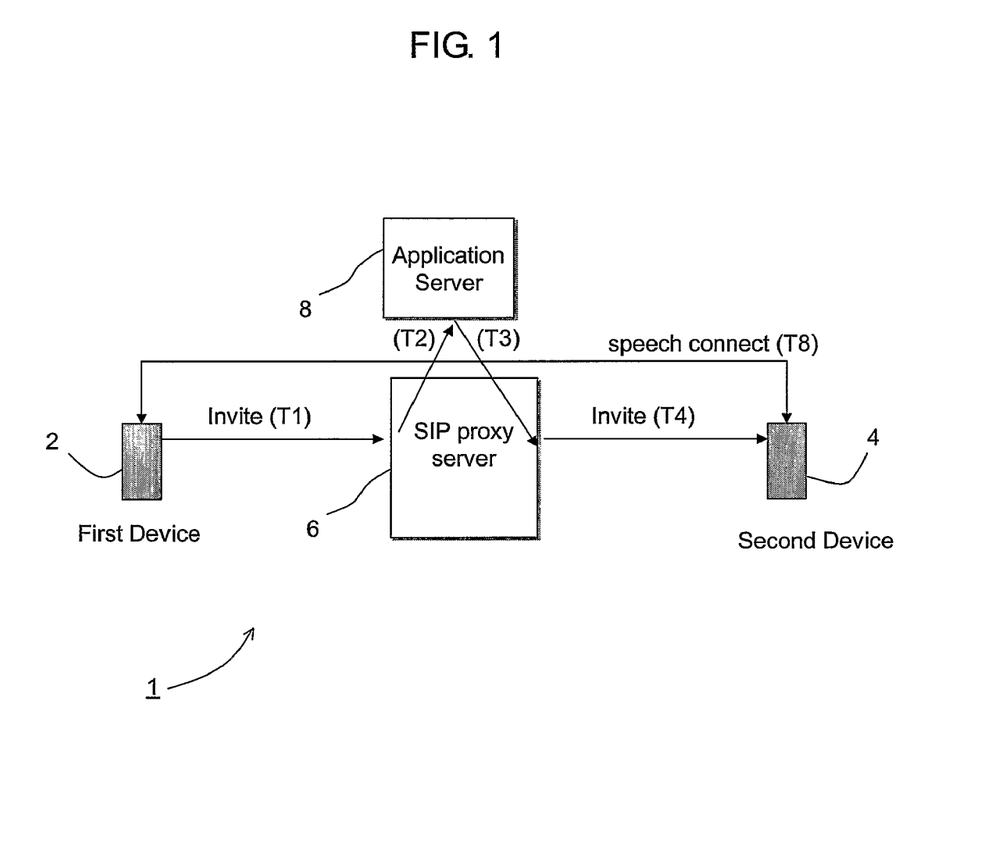
FIG. 1, discussed hereinbefore, is a block diagram illustrating a communications network using the Session Initiation Protocol in a known manner to establish a session.

FIG. 1 of the accompanying drawings is a schematic illustration of a communications network 1 which uses the SIP to initiate a voice session between a first device 2 and a second device 4. The communications network 1 further comprises a SIP proxy server 6 and an application server 8. The establishment of a voice session between the first and second devices 2 and 4 will now be described with reference to FIG. 2 of the accompanying drawings, which shows one example of the signal exchanges between the various components of the communications network 1 during the course of establishing the voice session.

Figure 2:
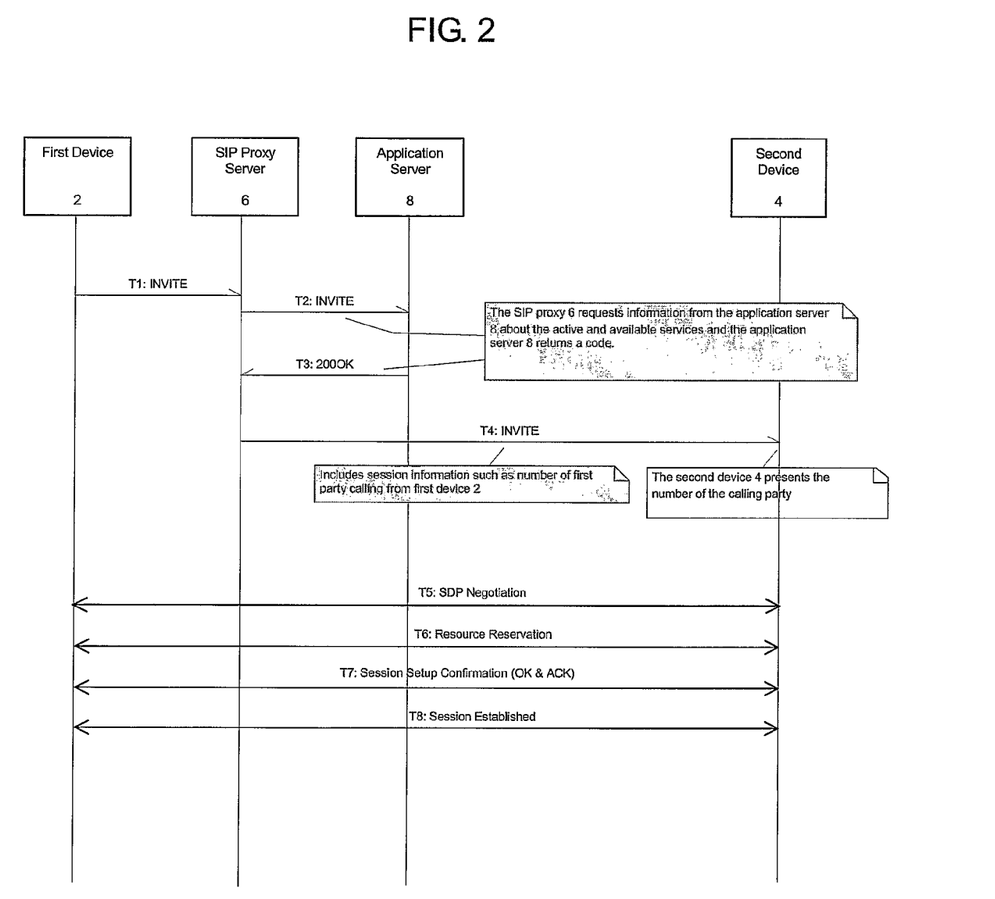
FIG. 2, also discussed hereinbefore, is a signal exchange diagram illustrating an exchange of signals in the network of FIG. 1.

In step T1, a SIP Invite message is sent from the first device 2 to the SIP proxy server 6. The Invite message is described in detail in the above-referenced RFC document, but in summary it is a text-based message containing certain information relating to the session. For example, the body of the Invite message contains a description of the session, encoded in some protocol format such as the Session Description Protocol (SDP, see RFC 2327). The Invite message also contains a number of text header fields each followed by a string indicating information relating to that field. For example, the "from" field is followed by a SIP URL address of the calling party, while the "to" field identifies the SIP URL address of the called party. Numerous other types of session information can be included in the Invite message, as described in RFC 3261.

In step T2, the Invite message is forwarded to the application server 8, by way of requesting information from the application server 8 relating to the active and available services. In step T3, the application server 8 returns a SIP "200 OK" response having a message body containing the requested information. In step T4, the SIP proxy server 6 sends the Invite message to the second device 4.

Since the Invite message received by the second device 4 contains information relating to the calling party associated with the first device 2, such as the name of the calling party, this allows the called party associated with the second device 4 to see information about the calling party before answering. This is similar to the Calling Line Identification Presentation (CLIP) function of conventional telephony services, where the telephone number of the calling party (and associated name if it is stored in the receiving device) is made available to the called party before answering. The CLIP function is typically enabled using a combination of DTMF (Dual Tone Multiple Frequency) and pole reversal wherein the telephone number of the calling party is sent from the local exchange before the ringing signal. Before the first ringing signal is sent, the called party's CLIP function is activated by the local exchange by reversing the polarity for the DC feed on the subscriber line. The telephone number of the calling party is then sent in the form of DTMF signals to the telephone display of the called party, and only then is the ringing signal sent to the called party.

Returning to the SIP example of FIG. 1, once the called party associated with the second device 4 has checked the information of the calling party associated with the first device 2, the following steps must be performed before the voice session can finally be established. In step T5, the two end parties perform a SDP negotiation in which the media characteristics for the session are negotiated in order to come to a decision on the media streams that can be supported in the session; in this example a basic voice call would be required. In step T6, the necessary resources are reserved for supporting the session, and once resource reservation is completed successfully, in step T7 the second device 4 sends a SIP "200 OK" final response and the first device 2 replies with a SIP "ACK" message to confirm the session set up. In step T8, the voice session has been established, allowing the respective users of the first and second devices 2 and 4 to speak to each other.

As described above, the SIP provides a useful framework for creating, modifying and terminating sessions. Nevertheless, it is desirable to extend the functionality of the SIP and other such session initiation protocols.

SUMMARY OF THE INVENTION

According to a first aspect of the present invention, there is provided a method of establishing a communications session between first and second devices associated with first and second parties respectively, comprising: sending a session request message indicating a request to establish the session and comprising session information relating to the session; in response to the session request message, retrieving further information and including the further information in the session request message; and establishing the session based on information in the resulting session request message.

The session information may comprise an indication of the first and second patties.

The method may further comprise identifying one or both of the first and second devices based on the session information.

The session request message may be sent from the first device.

The method may further comprise sending the session request message to the second device following inclusion of the further information.

The method may further comprise determining the type of further information that the second device or second user is registered for receiving in a session request message associated with the first device or first user, and wherein the retrieving and including steps are performed based on this determination.

The method may further comprise accepting the session request at the second device before the session is established.

The method may further comprise presenting the further information at the second device before the session is established.

The further information may be presented before the session is accepted.

The session request message may comprise text.

The session may be established between the first and second devices using the Session Initiation Protocol.

The network may be a UMTS network.

A proxy server of the network may perform the steps of retrieving and including the further information. A Serving Call Session Control Function (S-CSCF) server of a UMTS network may act as the proxy server.

The further information may comprise summary information from which complete information can subsequently be determined by the second device, for example after the session has been established. The complete information may be stored in a first database and the summary information derived from the complete information may be stored in a second database, and the method may further comprise synchronising the summary information in the second database with the complete information in the first database, and retrieving summary information from the second database for inclusion in the further information to enable the subsequent retrieval of complete information from the first database relating to that summary information.

The further information may be selected for inclusion in the session request message in dependence upon at least one party indicated in the session request message. One of the at least one party may be the first party. One of the at least one party may be the second party. The further information may comprise data relating to the first party that is likely to be of interest to the second party. The further information may relate to previous communications involving the at least one party. The further information may relate to previous email correspondence between the first and second parties.

According to a second aspect of the present invention, there is provided a communications network comprising: first and second devices associated with first and second parties respectively; means for sending a session request message indicating a request to establish a communications session between the first and second devices, the session request message comprising session information relating to the session; means for retrieving, in response to the session request message, further information and including the further information in the session request message; and means for establishing the session based on information in the resulting session request message.

According to a third aspect of the present invention, there is provided a method for use in a communications network comprising first and second devices associated with first and second parties respectively and means for sending a session request message indicating a request to establish a communications session between the first and second devices, the session request message comprising session information relating to the session and the method comprising retrieving further information in response to the session request message and including the further information in the session request message, the network further comprising means for establishing the session based on information in the resulting session request message.

According to a fourth aspect of the present invention, there is provided an apparatus for use in a communications network comprising first and second devices associated with first and second parties respectively and means for sending a session request message indicating a request to establish a communications session between the first and second devices, the session request message comprising session information relating to the session and the apparatus comprising means for retrieving further information in response to the session request message and including the further information in the session request message, the network further comprising means for establishing the session based on information in the resulting session request message.

According to a fifth aspect of the present invention, there is provided a database system comprising a first database for storing complete information, a second database for storing summary information derived from the complete information in the first database, and means for synchronising the summary information in the second database with the complete information in the first database, the second database comprising means for providing summary information to an external device and the first database comprising means for providing complete information to the or another external device relating to summary information previously provided from the second database to the external device.

According to a sixth aspect of the present invention, there is provided method of retrieving information from a first database storing complete information using a second database storing summary information derived from the complete information in the first database, comprising the steps of: (a) synchronising the summary information in the second database with the complete information in the first database; (b) providing summary information from the second database to an external device; and (c) providing complete information from the first device to the or another external device relating to summary information provided from the second database to the external device in step (b).

According to a seventh aspect of the present invention, there is provided database for storing summary information derived from complete information stored in a further database, comprising means for synchronising the summary information in the database with the complete information in the further database, and means for providing summary information to an external device to enable the or another external device subsequently to retrieve complete information from the further database relating to that summary information.

According to an eighth aspect of the present invention, there is provided method of enabling the retrieval of information from a first database storing complete information using a second database storing summary information derived from the complete information in the first database, comprising the steps of: (a) synchronising the summary information in the second database with the complete information in the first database; and (b) providing summary information from the second database to an external device to enable the or another external device subsequently to retrieve complete information from the first database relating to that summary information.

An embodiment of the fifth to eighth aspects of the present invention provide a technical advantage to an embodiment of the first to fourth aspects of the present invention by enabling a compact or condensed summary form of further information to be communicated in the session request message, thereby reducing bandwidth, with the option subsequently to retrieve full information where required.

According to a ninth aspect of the present invention, there is provided an operating program which, when run on an apparatus, causes the apparatus to carry out a method according to the third or the eighth aspect of the present invention.

According to a tenth aspect of the present invention, there is provided an operating program which, when loaded into an apparatus, causes the apparatus to become an apparatus according to the fourth aspect of the present invention or a database according to the seventh aspect of the present invention.

The operating program may be carried on a carrier medium. The carrier medium may be a transmission medium. The carrier medium may be a storage medium.

DETAILED DESCRIPTION OF THE PREFERRED EMBODIMENTS

Figure 3:
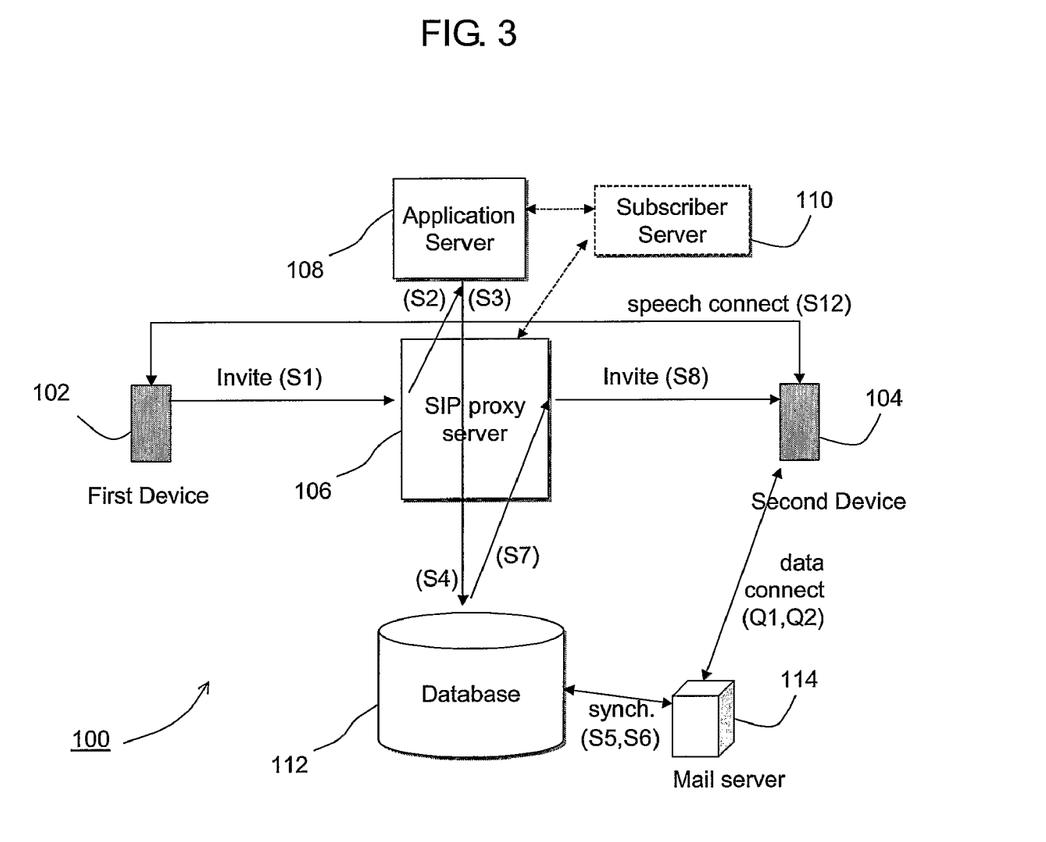
FIG. 3 is a block diagram showing a communications network according to an embodiment of the present invention.

FIG. 3 is a block diagram illustrating a communications network 100 embodying the present invention. The communications network 100 comprises a first device 102, a second device 104, a SIP proxy server 106, an application server 108, a subscriber server 110, a database 112 and a mail server 114. The first and second devices 102 and 104 are communications devices capable of exchanging data of a variety of different formats, including speech data. The respective users of the first and second devices 102 and 104 are therefore able to communicate with each other by voice.

The first and second devices 102 and 104 are multi-party devices capable of being used by more than one different user or party. For example, the second device 104 is capable of accepting voice calls directed to a number of different parties, and the first device 102 is able to originate calls from a number of different parties. Before a party or a device is able to establish sessions with other parties or devices, a registration procedure must first be carried out to provide details to the SIP proxy server 106 as to which device the party is using and where the device is located. The SIP Registration method is described in detail in RFC 3261 and further explanation is not required here. However, in an embodiment of the present invention, a party or device is able to register to receive "extended caller information" as will now be explained.

In the standard SIP, sufficient information is provided in the Invite message to enable the called party to determine the identity of the calling party before the called party has to accept or reject the call, as described above. An embodiment of the present invention enables a far wider range of information to be made available to the called party before he has to decide whether to take the call. This extra information is referred to in the present description either as "extended caller information" or "further information".

In the present embodiment, by way of example, the extended caller information comprises information relating to e-mail communications stored in the mail server 114 which have previously been sent between the calling party and the called party. As will be described below with reference to FIG. 5, the extended caller information is included in the SIP Invite message, and rather than including all of the mail server data relating to e-mails between the calling party and the called party in the further information to be included in the Invite message, it is possible that only summary information relating to the e-mail communications is included. In the present embodiment, the summary information comprises only the e-mail header information, including the e-mail titles.

Figure 4:
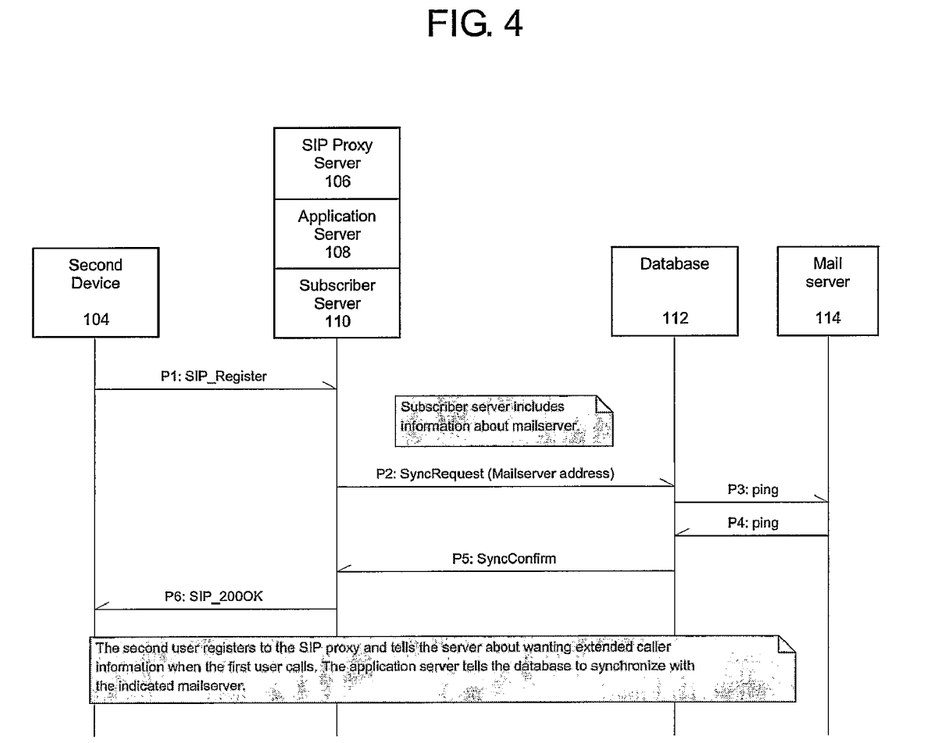
FIG. 4 is a signal exchange diagram showing a registration procedure carried out prior to establishment of a session in an embodiment of the present invention.

In the description that follows, it will be assumed that a first party is using the first device 102 to call a second party who is using the second device 104. The first party has already performed a registration procedure to register the first party as using the first device 102. One possible procedure for registering the second party as using the second device 104 is shown in FIG. 4. In this example, the second party wishes to indicate his preference for receiving extended caller information when the first party is calling him.

In step P1, a SIP Register message is sent from the second device 104 to the SIP proxy server 106, and information about the location of the second party is updated in the subscriber server 110. In step P2, the application server 108 sends a request to the database 112 to synchronise with the mail server 114 to retrieve the relevant summary information from the mail server to be included as extended caller information at a later stage. The address of the mail server 114 is determined by the application server 108 by reference to the subscriber server 110, this information being sent in step P2 to the database 112. In step P3, the database 112 verifies that the mail server 114 exists and is accessible, and the mail server responds in step P4. A synchronization procedure takes place to ensure that up-to-date summary information from the mail server 114 is stored in the database 112. An automatic synchronization can also be set up which causes the database 112 to synchronize with the mail server 114 at predetermined intervals. In step P5, the database 112 responds to the applicable server 108 with an acknowledgement. In step P6, the SIP proxy server 106 sends a SIP "200 OK" message back to the second device 104 to indicate a successful registration and request for extended caller information for calls from the first party.

Once the above registration procedure has been successfully concluded to register the second user with the SIP proxy server 106 and to indicate a requirement to receive extended caller information for calls from the first party, a method to establish a communications session between the first and second devices associated with the first and second parties respectively can be performed. Such a method will now be described with reference to FIG. 5.

Figure 5:
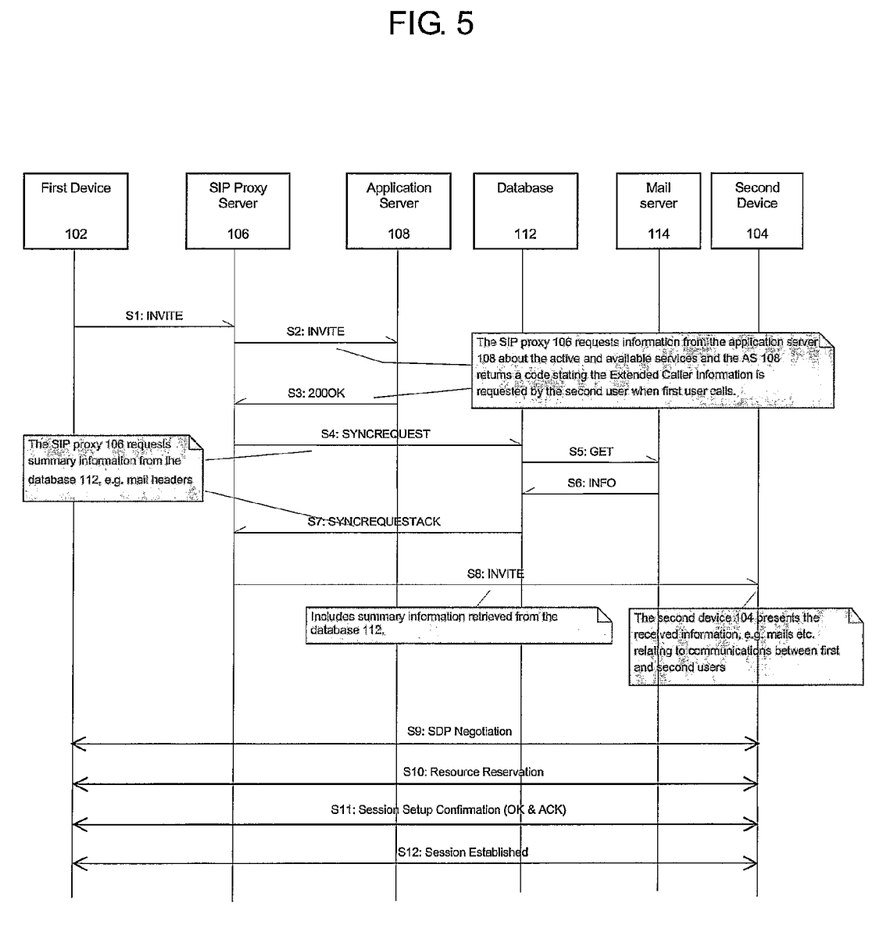
FIG. 5 is a signal exchange diagram showing the exchange of signals in a session establishment procedure according to an embodiment of the present invention.

In step S1, a SIP Invite message is sent from the first device 102 to the SIP proxy server 106, indicating a request to establish a session between the first and second devices and comprising session information relating to the session. For example, the session information comprises an indication of the first and second parties. In step S2, the SIP proxy server 106 requests information from the application server 108 concerning the active and available services. In step S3, the application server 108 returns a SIP code "200 OK" providing the requested information and indicating that extended caller information has been requested by the second party when the first party is calling.

In response to this indication that extended caller information is required, the SIP proxy server 106 requests in step S4 summary information from the database 112 which is to be used as the extended caller information. The database 112 notices that the stored summary information is not up to date, and accordingly in step S5 the database 112 synchronises with the mail server 114 by requesting up-to-date summary information, which is returned from the mail server 114 to the database 112 in step S6. The summary information is then returned to the SIP proxy server 106 in step S7.

Upon receipt of the summary information, the SIP proxy server 106 includes the information in the body of the Invite message which is then forwarded to the second device 104. The further information can be included in an extension header field of the SIP (for more, see RFC 3261). Upon receipt of the Invite message including the summary information, the information is presented at the second device 104 for inspection by the second party before deciding whether or not to accept the request to establish a session. In this embodiment, the second party would be able to view a summary of e-mails sent between the first and second parties, as well as other information extracted from the session information in the Invite message such as the number and name of the first party.

If the second party decides to accept the call, a session is established between the first and second devices 102 and 104 based on information in the received Invite message by performing steps S9 to S12 which correspond to steps T5 to T8 described above with reference to FIG. 2.

Figure 6:
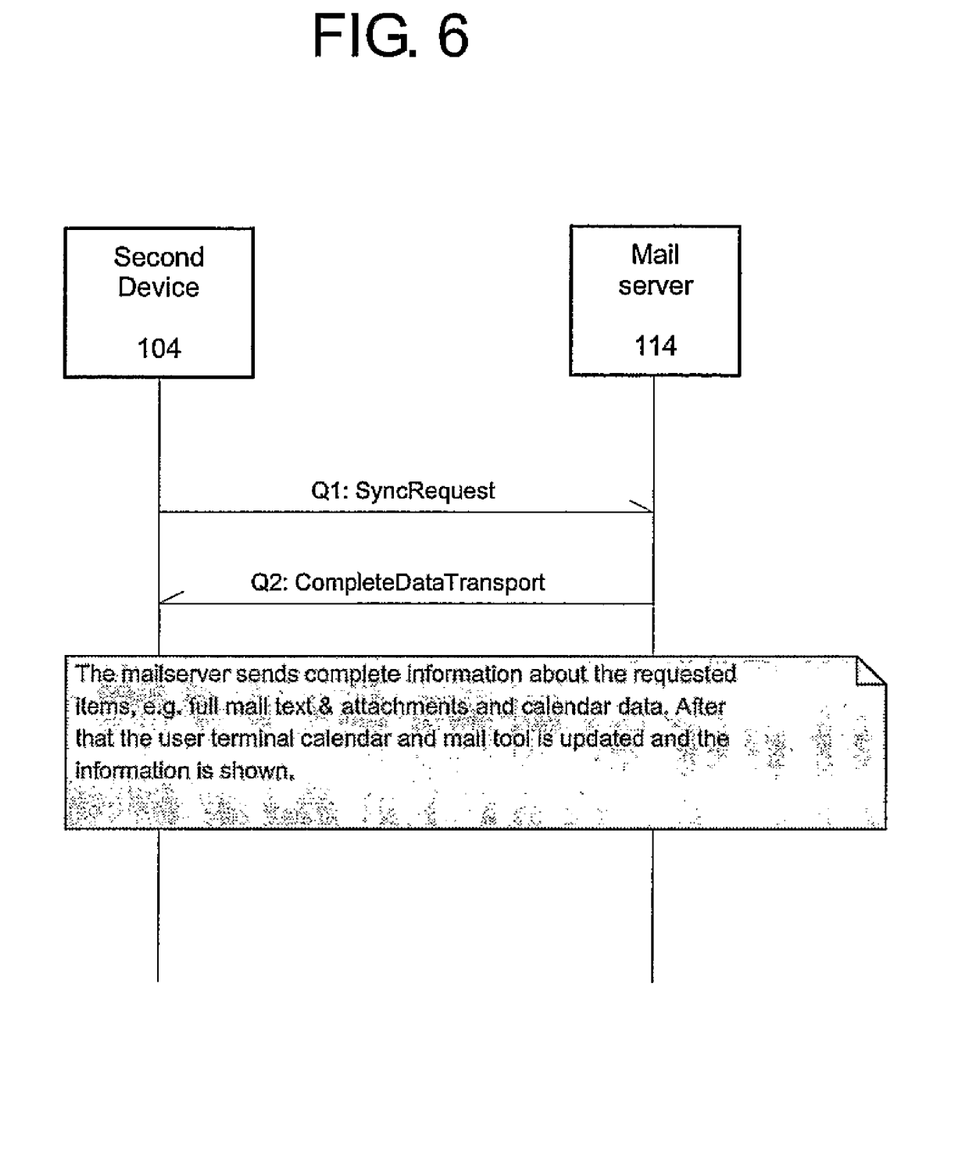
FIG. 6 is a signal exchange diagram illustrating the retrieval of complete information based on already-received summary information.

As mentioned above, the further information (or extended caller information) included in the Invite message received by the second device 104 is summary information relating to the e-mail correspondence between the first and second parties and as such does not include complete information relating to that e-mail correspondence; for example, the main message bodies of the e-mails are not included in the summary information. If the second party wishes to view complete information relating to any one or more of the e-mail items, this can be achieved by direct communication between the second device 104 and the mail server 114 as illustrated in FIG. 6. In step Q1 of FIG. 6, the second device 104 requests complete information from the mail server 104 relating to one or more items specified in the request. The requested complete data is returned from the mail server 114 to the second device 104 in step Q2. Such a request for complete information based on the summary information can be made at any time after receipt of the Invite message, either before or after the session is established.

Although it is described above with reference to steps P2 to P5 in FIG. 4 that a synchronisation is performed and/or set up between the database 112 and the mail server 114 at the registration stage, this is not essential since synchronisation can be requested during the Invite procedure as described above with reference to steps S4 to S7 of FIG. 5.

It is possible that an Invite message requesting establishment of a session between the first and second parties associated with the first and second devices respectively does not actually originate from the first device 102. For example, it is possible that the Invite message is sent by a third party from a third device. It is also possible that, although the Invite message indicates the second party as being the intended recipient of the call, the Invite message is actually processed by a further device such that the further information is displayed at the further device and the session is initially established between the first device 102 and the further device, with the call then being forwarded to the second party using the second device 104. The Invite message indicates a request to set up a session between two parties at whatever respective devices those parties happen to be using at the time; information about the actual devices to be uses for the session between the two parties is determined from the subscriber server 110.

The usefulness of the present invention can be extended beyond just the inclusion of e-mail information in the extended caller information. For example, if the first party is calling his bank then the extended caller information could include certain information relating to the bank account of the first party. Another possibility is where the first party is calling a department store, and in this situation the extended caller information could include details relating to the first party such as his registered information and order status. Other such examples will be readily apparent to the skilled person. For example, any information relating to the first party that is likely to be of interest to the second party is a candidate for inclusion in the further information.

In the above embodiment, the relevant extended caller information is located on the mail server 114, and this is retrieved by the SIP proxy server 106 not directly but through the database 112. It will be appreciated that the SIP proxy server could also retrieve the further information directly from the database or another server. Likewise, the above embodiment has been described in relation to the Session Initiation Protocol but any other equivalent protocol could be used; for example the invention can be applied to ISUP U2U information (ISDN User Part user-to-user information), where the text string is passed as is and therefore can be imparted with extended caller information. Communications between the mail server 114 and the database 112 or the second device 104 can use the Internet Message Access Protocol (IMAP); communications between the database 112 and the SIP proxy server 106 can use the Structured Query Language (SQL); and direct communications between the first device 102 and the second device 104 after session establishment can use the Real-time Transport Protocol (RTP). However, an embodiment of the present invention is not limited to such example communications protocols.

As mentioned above, SIP has become increasingly popular in the Voice-over-IP community, and in particular SIP has been chosen as the signalling protocol for establishing multimedia sessions in UMTS Release 5 IP Multimedia Subsystems (IMS). A summary of how the present invention can be applied within the context of a combination of UMTS and SIP will be described below with reference to FIG. 7 but further details of the use of SIP within UMTS can be found from the 3GPP Technical Specification TS 24.228 V5.8.0 (2004-03).

UMTS is a third generation wireless system designed to provide higher data rates and enhanced services to subscribers. UMTS is a successor to the Global System for Mobile Communications (GSM), with an important evolutionary step between GSM and UMTS being the General Packet Radio Service (GPRS). GPRS introduces packet switching into the GSM core network and allows direct access to packet data networks (PDNs). This enables high-data rate packets switch transmissions well beyond the 64 kbps limit of ISDN through the GSM call network, which is a necessity for UMTS data transmission rates of up to 2 Mbps. UMTS is standardised by the $3^{rd}$ Generation Partnership Project (3GPP) which is a conglomeration of regional standards bodies such as the European Telecommunication Standards Institute (ETSI), the Association of Radio Industry Businesses (ARIB) and others.

The standardisation of UMTS has progressed in three phases. The first phase is known as Release '99. The Release '99 specifications define the basic architecture that consists of the UMTS Terrestrial Radio Access Network (UTRAN), Circuit Switched Core Network (CS-CN) and Packet Switched Core Network (PS-CN). The release '99 specification offers traditional circuit as well as packet-switched services. The next phase in the standardisation process is Release 4, adding new services to the '99 architecture. Release 5 represents a significant shift, offering both traditional telephony as well as packet-switched services over a single converged packet-based network.

The UMTS Release 5 architecture adds a new subsystem known as the IP Multimedia Subsystem (IMS) to the PS-CN for supporting traditional telephony as well as new multimedia services. The IMS is able to connect to both PSTN/ISDN (Public Switched Telephone Network/Integrated Services Digital Network) as well as the Internet. The 3GPP has chosen SIP for signalling between a User Equipment (UE) and the IMS as well as between the components within the IMS.

Figure 7:
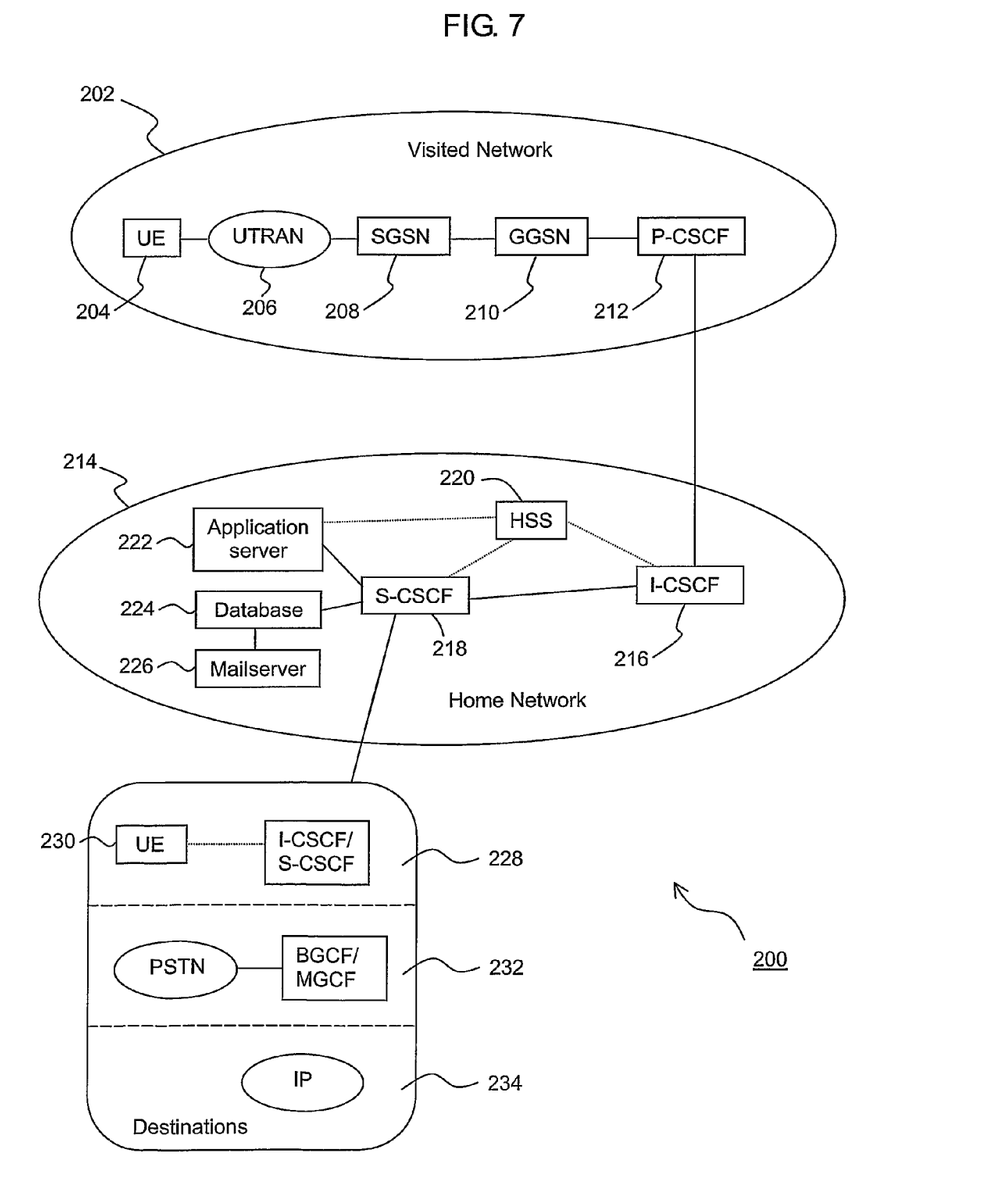
FIG. 7 is a schematic diagram illustrating the application of an embodiment of the present invention to a UMTS network.

FIG. 7 is an illustrative diagram showing an embodiment of the present invention within the UMTS context. A communications network 200 is shown as comprising a UE 204 located within a Visited Network 202. The UE 204 is attached to a Serving GPRS Support Node (SGSN) 208 via a UTRAN, which is in turn in communication with a Gateway GPRS Support Node (GGSN) 210. Within the Visited Network 202, the GGSN 210 communicates with a Proxy Call Session Control Function (P-CSCF) 212, which is the first point of contact in the visited IMS network for the UE 204. The P-CSCF forwards SIP registration messages and session establishment messages to the Home Network 214.

The first point of contact within the Home Network 214 is the Interrogating Call Session Control Function (I-CSCF) 216, which is an optional node in the IMS architecture, whose main purpose is to query the Home Subscriber Server (HSS) 220 to find the location of the Serving Call Session Control Function (S-CSCF) 218. The S-CSCF 218 performs session management for the IMS network, and there can be several S-CSCFs in the network. The HSS 220 is a centralised subscriber database, and has evolved from the Home Location Register (HLR) from earlier UMTS releases. The HSS 220 interfaces with the I-CSCF and the S-CSCF to provide information about the location of the subscriber and the subscriber's subscription information.

The communications network 200 further comprises an application server 222, a database 224 and a mail server 226 located in the Home Network 214. From the S-CSCF 218, signalling messages are passed to the intended destination, which may be another Release 5 IMS network 228 comprising a UE 230, or to a legacy network 232 comprising a PSTN interfaced through a Media Gateway Control Function (MGCF), or to an IP network 234.

Specific details of the operation of the UMTS communications network 200 and of the various components within such a network can be found from the Technical Specifications for UMTS. However, a correspondence between parts of the communications network 100 described above with reference to FIG. 3 and parts of the communications network 200 shown in FIG. 7 will be readily apparent, and therefore it will be apparent to the skilled person how the method of establishing a communications session described above with reference to FIG. 3 can be applied to the FIG. 7 network.

A summary of the correspondence between the parts is as follows: The UE 204 corresponds to the first device 102; the UE 230 corresponds to the second device 104; the database 224 corresponds to the database 112; the application server 222 corresponds to the application server 108; the mail server 226 corresponds to the mail server 114; the HSS 220 corresponds to the subscriber server 110; and one or more of the P-CSCF 212, I-CSCF 216 and S-CSCF 218 corresponds to the SIP proxy server 106.

In brief, the UE 204 establishes a connection to the SGSN 208 through the UTRAN 206 using the UMTS Attach procedure. Once the UE 204 is attached to the SGSN 208, it must activate a PDP (Packet Data Protocol) address (for example, an IP address) when it wishes to begin packet data communications, including using SIP services. Activating a PDP address sets up an association between the UE's current SGSN 208 and the GGSN 210, and a record of the association is known as a PDP context. The activation of a PDP context is performed by the UMTS PDP Context Activation procedure. After the UE 204 has attached to the network and activated a PDP context, SIP service registration can then be performed, for example in accordance with the method shown in FIG. 4 relating to the second device 104, before it can establish a communications session. During the course of service registration, the HSS 220 is notified of the current location of the UE 204, updating the subscriber profile accordingly. The Home Network 204 also selects a suitable S-CSCF 218 for the UE 204 and the subscriber profile is sent to that S-CSCF 218. Following the registration procedure, a communications session can then be established between the UE 204 and the UE 230 following the procedure set out and described above with reference to FIG. 5.

It will be appreciated that the present invention is not limited to any particular type of network architecture such as the UMTS architecture. For example, the present invention can be applied to a GPRS architecture, or to PSTN (ISUP).

It will be appreciated that operation of one or more of the first device 102, SIP proxy server 106 and second device 104 can be controlled by a program operating on the device. Such an operating program can be stored on a computer-readable medium.

What is claimed is:

1. A method, in a Universal Mobile Telecommunications System (UMTS) communications network, of establishing a communications session between first and second devices associated with first and second parties respectively, the method comprising:
   sending a session request message from the first device to a Session Initiation Protocol (SIP) proxy server indicating a request to establish the session and comprising session information relating to the session;
   in response to the session request message, the SIP proxy server retrieving extended caller information and including the extended caller information in the session request message, the extended caller information being summary information, from which complete information can subsequently be determined by the second device, in a first database, synchronized with a related complete information in a second database for which the second device is registered, the complete information being stored in the first database and the summary information, derived from the complete information, being stored in the second database;
   synchronizing the summary information in the second database with the complete information in the first database,
   retrieving summary information from the second database for inclusion in the extended caller information to enable the subsequent retrieval of complete information from the first database relating to the summary information from the second database;
   the SIP proxy server sending the session request message to the second device; and
   establishing the communications session based on the session information and the extended caller information in the resulting session request message.

2. The method as claimed in claim 1, wherein the session information comprises an indication of the first and second parties.

3. The method as claimed in claim 1, further comprising identifying one or both of the first and second devices based on the session information.

4. The method as claimed in claim 1 further comprising sending the session request message to the second device following inclusion of the extended caller information.

5. The method as claimed in claim 4, further comprising determining the type of extended caller information that the second device or second user is registered for receiving in a session request message associated with the first device or first user, and wherein the retrieving and including steps are performed based on this determination.

6. The method as claimed in claim 4, further comprising accepting the session request at the second device before the session is established.

7. The method as claimed in claim 4, further comprising presenting the extended caller information at the second device before the session is established.

8. The method as claimed in claim 1, wherein the session request message comprises text.

9. The method as claimed in claim 1, wherein the session is established between the first and second devices using Session Initiation Protocol.

10. The method as claimed in claim 1, wherein a proxy server of the network performs the steps of retrieving and including the extended caller information.

11. The method as claimed in claim 10, wherein a Serving Call Session Control Function (S-CSCF) server of the UMTS network acts as the proxy server.

12. The method as claimed in claim 1, wherein the extended caller information is selected for inclusion in the session request message in dependence upon at least one party indicated in the session request message.

13. The method as claimed in claim 12, wherein one of the at least one party is the first party.

14. The method as claimed in claim 12, wherein one of the at least one party is the second party.

15. The method as claimed in claim 14, wherein the extended caller information comprises data relating to the first party that is of interest to the second party.

16. The method as claimed in claim 12, wherein the extended caller information relates to previous communications involving the at least one party.

17. The method as claimed in claim 16, wherein the extended caller information relates to previous email correspondence between the first and second parties.

18. A Universal Mobile Telecommunications System (UMTS) communications network comprising:
   first and second devices associated with first and second parties respectively;
   means for sending a session request message, by the first device to a Session Initiation Protocol (SIP) proxy server indicating a request to establish a communications session between the first and second devices, the session request message comprising session information relating to the session;
   means for retrieving by the second device from the SIP proxy server, in response to the session request message, extended caller information and for including the extended caller information in the session request message, the extended caller information being summary information from which complete information can subsequently be determined by the second device, in a first database, synchronized with a related complete information in a second database for which the second device is registered, the complete information being stored in the first database and the summary information, derived from the complete information, being stored in the second database;
   synchronizing the summary information in the second database with the complete information in the first database,
   retrieving summary information from the second database for inclusion in the extended caller information to enable the subsequent retrieval of complete information from the first database relating to the summary information from the second database; and
   means for establishing the session based on information in the resulting session request message.

19. A method for use in a Universal Mobile Telecommunications System (UMTS) communications network associated with first and second devices the method comprising:
- the first device sending a session request message to a Session Initiation Protocol (SIP) proxy server indicating a request to establish a communications session between the first and second devices, the session request message comprising session information relating to the session in a first database, synchronized with a related complete information in a second database for which the second device is registered,
- the SIP proxy server retrieving extended caller information in response to the session request message and including the extended caller information in the session request message, the extended caller information being summary information, from which complete information can subsequently be determined by the second device, in a first database, synchronized with a related complete information in a second database for which the second device is registered, the complete information being stored in the first database and the summary information, derived from the complete information, being stored in the second database;
- synchronizing the summary information in the second database with the complete information in the first database,
- retrieving summary information from the second database for inclusion in the extended caller information to enable the subsequent retrieval of complete information from the first database relating to the summary information from the second database;
- the SIP proxy server sending the session request message to the second device, in a first database, synchronized with a related complete information in a second database, for which the second device is registered; and
- establishing the session based on information in the resulting session request message.

20. An apparatus for use in a Universal Mobile Telecommunications System (UMTS) communications network comprising first and second devices associated with first and second parties respectively, the apparatus comprising:
- means for sending a session request message from the first device to a Session Initiation Protocol (SIP) proxy server indicating a request to establish a communications session between the first and second devices, the session request message comprising session information relating to the session;
- means for the SIP proxy server retrieving extended caller information in response to the session request message and including the extended caller information in the session request message, the extended caller information being summary information, in a first database, synchronized with a related complete information in a second database, the summary information being derived from the complete information;
- synchronizing the summary information in the first database with the complete information in the second database,
- retrieving summary information from the first database for inclusion in the extended caller information to enable the subsequent retrieval of complete information from the second database relating to the summary information from the first database; and
- means for establishing the session based on information in the resulting session request message.

* * * * *

UNITED STATES PATENT AND TRADEMARK OFFICE
CERTIFICATE OF CORRECTION

PATENT NO.       : 7,882,239 B2                                   Page 1 of 1
APPLICATION NO.  : 11/569708
DATED            : February 1, 2011
INVENTOR(S)      : Ekberg It is certified that error appears in the above-identified patent and that said Letters Patent is hereby corrected as shown below:

On the Face Page, in Field (57), under "ABSTRACT", in Column 2, Line 7, delete "A" and insert -- The --, therefor.

In Column 3, Line 36, delete "patties." and insert -- parties. --, therefor.

Signed and Sealed this
Nineteenth Day of April, 2011

David J. Kappos
*Director of the United States Patent and Trademark Office*